(No Model.)
H. C. CHAMBERLIN.
VEHICLE BRAKE.
No. 541,344. Patented June 18, 1895.
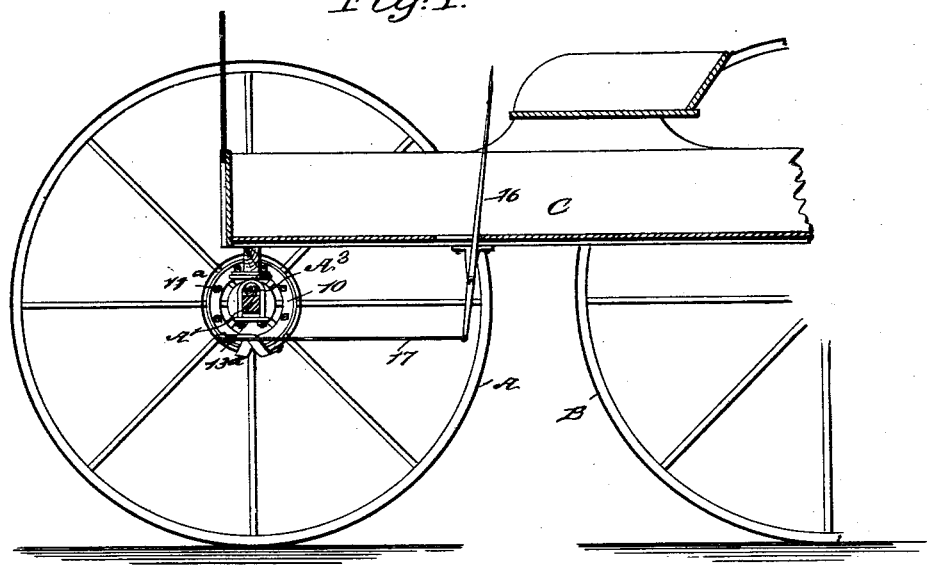
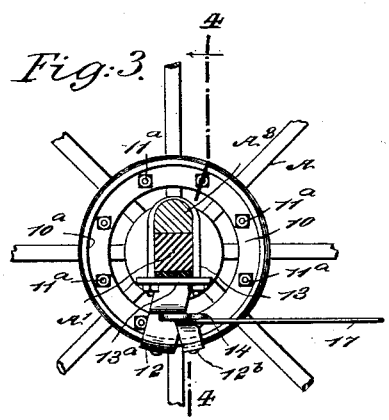
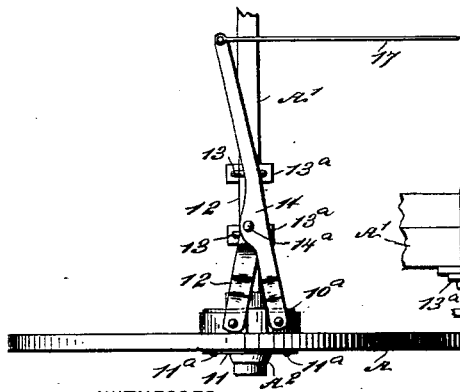
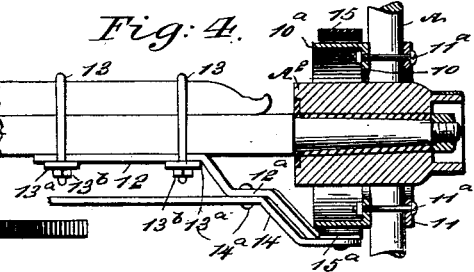
WITNESSES:
INVENTOR
H. C. Chamberlin
BY Munn & Co
ATTORNEYS.

UNITED STATES PATENT OFFICE.

HENRY C. CHAMBERLIN, OF LANESBOROUGH, PENNSYLVANIA.

VEHICLE-BRAKE.

SPECIFICATION forming part of Letters Patent No. 541,344, dated June 18, 1895.

Application filed November 1, 1894. Serial No. 527,643. (No model.)

*To all whom it may concern:*

Be it known that I, HENRY C. CHAMBERLIN, of Lanesborough, in the county of Susquehanna and State of Pennsylvania, have invented a new and Improved Vehicle-Brake, of which the following is a full, clear, and exact description.

My invention relates to an improved vehicle brake of the friction band type, and has for its object to provide a device of the character indicated, which will be readily attachable to the hub of a vehicle wheel and to its axle, without a special construction being required for the usual running gears of the vehicle, and that will when so applied, afford convenient and reliable means for arresting motion of the vehicle, dispensing with the usual appliances for the purpose mentioned.

To this end my invention consists in the construction and combination of parts, as is hereinafter described and indicated in the claim.

Reference is to be had to the accompanying drawings, forming a part of this specification, in which similar letters and figures of reference indicate corresponding parts in all the views.

Figure 1 is a side view of a main portion of a vehicle, partly in section, and the improvement in position for service on the front axle of the vehicle. Fig. 2 is an inverted plan view of the improvement, showing its application to a vehicle wheel and axle. Fig. 3 is an enlarged inner side view of the improvements as applied to an axle and vehicle wheel, and Fig. 4 is a transverse sectional view of parts shown in Fig. 3 on the line 4 4 in said figure.

The invention consists in a peculiarly constructed friction hub, readily attachable to the spokes of any vehicle wheel near its hub and concentric with said hub.

The invention also consists in providing a peculiarly formed bracket arm, and means for quickly and neatly attaching said arm to the vehicle axle near the friction hub, so as to furnish a reliable support for one end of a hoop-like friction band forming part of the brake device, whereby said band is sustained in position for a clasping engagement with the friction hub, when the other end of the curved band is drawn on by a lever pivoted on the bracket arm that supports the band.

In the drawings, A indicates one of the front wheels of a vehicle; B, part of one of the rear wheels; C, the front body portion of the vehicle, and A' the front axle of the vehicle, these parts being shown to illustrate the application of the improvements that are represented in this instance as applied to the front axle and one of the front wheels.

The friction hub forming part of the improvement, consists of an annular metal plate 10, having an opening of sufficient diameter to allow it to be placed around the hub $A^2$ of the wheel A. On the outer edge of the plate 10, a laterally projecting flange $10^a$ is formed or secured, which flange is cylindrical, and made true on its outer face to adapt it for its effective service as a friction bearing.

The friction hub composed of the parts 10, $10^a$, is held in place on the spokes of the wheel A, concentric with its hub $A^2$, by the clamping bolts $11^a$, that are first inserted in spaced apertures formed in a clamping plate 11 and then passed between the spokes, the threaded ends of the bolts being passed through spaced perforations in the annular plate 10, and receiving nuts that when screwed against the plate 10 hold the friction hub in secure connection with the wheel A. The clamping plate 11 is flat and ring-like, its interior diameter being sufficient to allow it to pass over the outer end of the hub $A^2$, and rest against the spokes of the wheel A, as shown in Fig. 4, so that the bolts $11^a$, will, when inserted through said plate, as before mentioned, and then passed between the spokes of the wheel, be adapted to bind the friction hub and plate 11, on the wheel A, concentric with its hub.

On the axle A', a bracket arm 12, is detachably clamped near the wheel A, by the clip bands 13, which also serve to retain the wooden and metal portions of the axle together, said bands passing downwardly over the wooden portion $A^3$ of the axle A', and on each side of the metal portion of the axle, the bands receiving at their threaded ends the perforated clamping plates $13^a$, and having nuts $13^b$ screwed on them after they are inserted through said plates, whereby the bracket arm 12 is held in firm connection with the lower side of the axle.

The portion of the bracket arm 12 that projects toward the wheel A, is bent downwardly and then toward the friction hub flange 10ª, as shown clearly in Fig. 4, and on a level part 12ª of the bent portion the lever 14 is pivoted, as represented at 14ª, the lever being also bent down and then out toward the friction hub, so that its outer end will afford a seat for one end 15ª of the friction band 15, that is attached to it by any suitable means. The band 15 is preferably formed of an elastic metal strip which is nearly equal in width with the circular flange 10ª that it encircles, the other end of said friction band being affixed to the rear end of the bracket arm 12, the latter extending under the friction hub so as to permit this connection of parts to be made, as shown at 12ᵇ in Fig. 3.

In Fig. 2 it will be seen that the bracket arm 12 is bent edgewise out of line with the axle A', at the end nearest to the friction hub which end bears the spring friction band, and as will also be noticed the resilience of the band causes it to diverge its ends and thus throw the lever 14 rearwardly at its inner end.

For convenience in operating the brake device, an upright lever 16 is pivoted between its ends at one side of the vehicle body, the lower end having an operative connection formed with the inner end of the lever 14 by a link rod 17, or a flexible connection may be used if preferred.

In operation, the driver seated in the vehicle moves the lever 16 forwardly, and this draws the friction band 15, closely around the friction hub flange 10ª, which will retard or stop the vehicle wheel A from rotating, the frictional contact of its tire which then slides on the ground, serving to check a forward movement of the vehicle. Should it be desired, the parts of the brake may be actuated by foot pressure by shortening the upper portion of the lever 16 and providing it, at its upper end, with a suitable rest to permit of the application of foot pressure to it.

It will be observed that a duplicate of the brake device may be employed, if considered necessary, and can be located on the rear wheel or wheels of the vehicle so as to operate as effectively as by the arrangement of the same on the front wheel or wheels of the vehicle.

It is claimed that the improved construction of the brake device, its convenient and quick attachment to or removal from a vehicle is afforded, and that as an entirety, the improvement is practical and may be applied to any wheeled vehicle of ordinary construction.

Having thus described my invention, I claim as new and desire to secure by Letters Patent—

In a vehicle brake, the combination, with the vehicle wheel and its axle, of a friction hub comprising an annular plate, a cylindrical flange projecting laterally therefrom, a clamping plate on the outer side of the wheel, and bolts passing between the spokes of the wheel and connecting the exterior clamping plate to the friction hub, an elastic friction band encircling the friction hub, a bracket arm secured at one end to the axle by clips bent downwardly and extending below the friction hub, one end of the friction band being secured to said end of the arm, and a vibratile lever pivoted on the bracket arm and having one end fastened to the other end of the friction band, substantially as described.

HENRY C. CHAMBERLIN.

Witnesses:
GEORGE E. WOOD,
WM. LUSCOMB.